Nov. 22, 1938.  J. F. KING  2,137,914
AUTOMOBILE BUMPER
Filed Sept. 25, 1937   2 Sheets-Sheet 1

Inventor
James F. King

By Clarence A. O'Brien
Hyman Berman
Attorneys

Nov. 22, 1938.  J. F. KING  2,137,914
AUTOMOBILE BUMPER
Filed Sept. 25, 1937   2 Sheets-Sheet 2
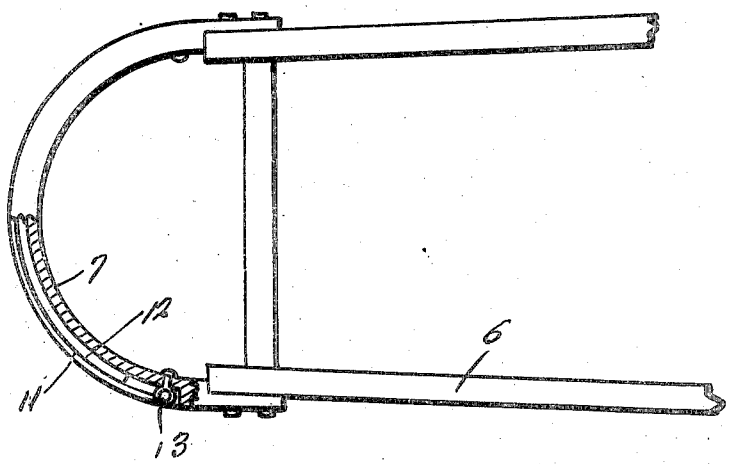
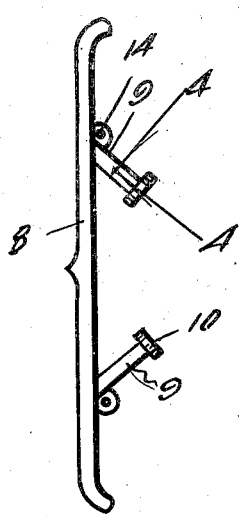
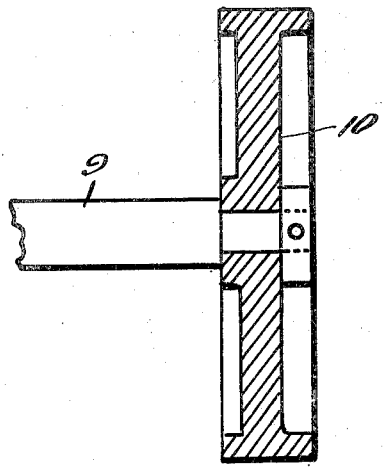
Inventor
James F. King
By *Clarence A. O'Brien*
*Hyman Berman*
Attorneys Patented Nov. 22, 1938

2,137,914

UNITED STATES PATENT OFFICE 2,137,914

AUTOMOBILE BUMPER

James Frederick King, Little Rock, Ark., assignor of one-fourth to William W. Shepherd and one-fourth to George Bale, both of Little Rock, Ark.

Application September 25, 1937, Serial No. 165,753

3 Claims. (Cl. 293—55)

This invention appertains to new and useful improvements in bumpers for automobiles and like vehicles.

The principal object of the present invention is to provide a bumper which will yield in a manner to displace force in a glancing direction.

Another object of this invention is to provide a bumper of the character stated which is movable fore and aft around a central point.

Another important object of the invention is to provide a bumper of the character stated which can be easily and inexpensively mounted on the conventional automobile structure.

These and various other important objects and advantages of the invention will become apparent to the reader of the following specification.

In the drawings:—

Figure 2 is a fragmentary vertical sectional view of an automobile chassis showing the guide rail mounted thereon.

Figure 3 is a top plan view of the bumper proper.

Figure 4 is a fragmentary enlarged sectional view on the line 4—4 of Figure 3.

Figure 1:
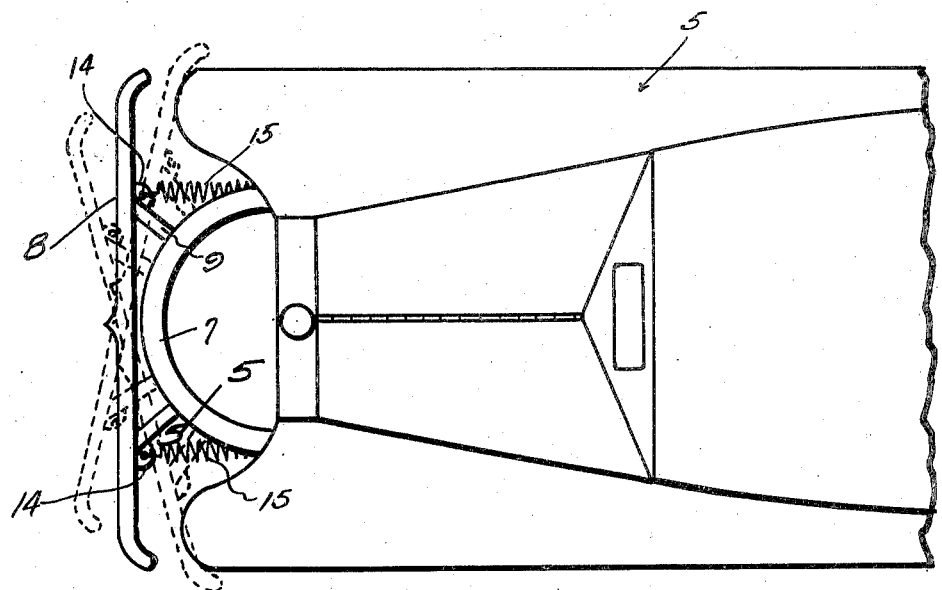
Figure 1 represents a fragmentary top plan view of an automobile showing the bumper mounted thereon.
Figure 5:
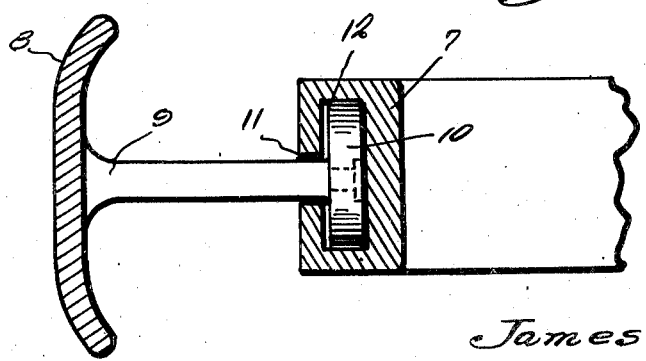
Figure 5 is a fragmentary detailed sectional view.

Referring to the drawings wherein like numerals designate like parts, it can be seen that numeral 5 denotes a conventional automobile body structure supported by the chassis 6.

In carrying out the present invention, a semi-circular shaped trackway 7 is provided as a guide and support for the bumper bar 8. The bumper bar 8 is provided with inwardly directed arms 9 each of which at its rear end is provided with a roller 10. The arms 9 extend through the slot 11 in the front side of the trackway 7 while the rollers 10 ride in the channelway 12. Top members 13 are provided in the ends of the channelway 12 of the trackway 7.

The bumper bar 8 adjacent the end thereof is provided with apertured ears 14 and between this and the ends of the trackway 7 are coiled extensible springs 15 which will serve to right the bumper bar 8 to the full line position shown in Figure 1 after it has been forced to one side or the other as indicated in broken lines in Figure 1.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A vehicle bumper comprising a semi-circular shaped trackway, a bumper bar, arms extending from the bumper bar, said arms being provided with heads on their free ends slidable on the said track, said trackway being provided with a channel therein, said heads on the arms being in the form of rollers slidable in the said channel.

2. A bumper for use on the chassis frame of an automobile comprising an arcuate bar-like support adapted for attachment at its ends to said frame to extend across the front of the latter in forwardly bowed position, and a bumper bar mounted on said support to extend across the front thereof and yieldingly movable bodily along said support in opposite directions, respectively, from a normal central position whereby said bar is caused under impact against the ends thereof to assume oblique positions relative to the normal and to direct the force of the impact laterally in a glancing direction.

3. A bumper for use on the chassis frame of an automobile comprising an arcuate bar-like support adapted for attachment at its ends to said frame to extend across the front end thereof in forwardly bowed position, a bumper bar, means to mount said bar on said support to extend across the front thereof comprising arms extending rearwardly from said bar, rollers on said arms mounting the same on said support whereby said arms and bar are movable bodily along said support toward either end thereof from a normal position, and spring means for yieldingly retaining said bar and arms in normal position.

JAMES FREDERICK KING.